(No Model.)
F. L. ESCHBACH.
MACHINE FOR CUTTING CLOTH.
No. 335,996. Patented Feb. 9, 1886.
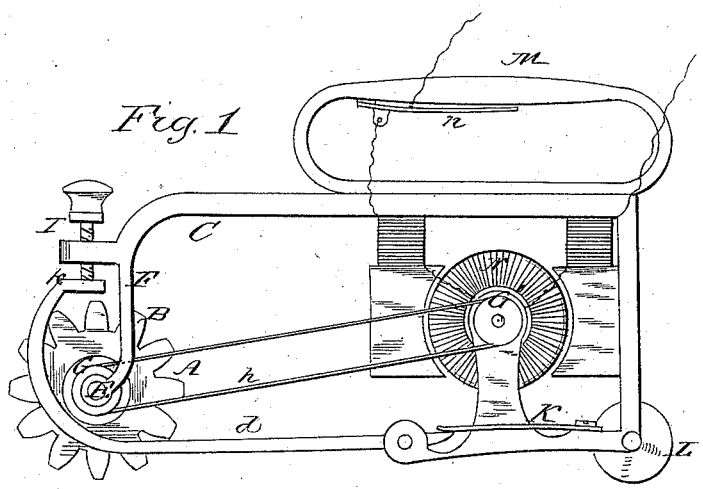
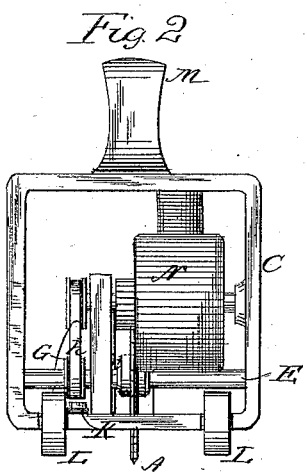
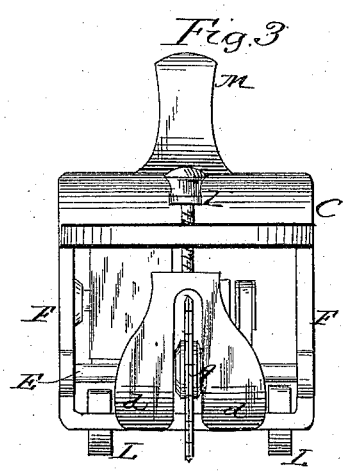
Witnesses
George J. Eschbach
A. C. Rawlings
Francis L. Eschbach
Inventor
by Connolly Bros
Attys

UNITED STATES PATENT OFFICE.

FRANCIS L. ESCHBACH, OF NEW YORK, N. Y.

MACHINE FOR CUTTING CLOTH.

SPECIFICATION forming part of Letters Patent No. 335,996, dated February 9, 1886.

Application filed April 3, 1885. Serial No. 161,116. (No model.)

*To all whom it may concern:*

Be it known that I, FRANCIS L. ESCHBACH, a citizen of the United States, residing at New York, in the county of New York and State of New York, have invented certain new and useful Improvements in Machines for Cutting Cloth; and I do hereby declare the following to be a full, clear, and exact description of the invention, reference being had to the accompanying drawings, which form part of this specification, in which—

Figure 1 is a side elevation of a machine embodying my improvements. Fig. 2 is a rear end view, and Fig. 3 is a front elevation, of the same.

This invention has relation to machines for cutting cloth into patterns for the manufacture of garments, and has for its object the provision of novel means whereby patterns may be cut in large quantities and in an expeditious and economical manner.

My invention contemplates the employment of a cutter, suitably mounted in a frame and actuated by appropriate motive power, whereby a number of layers of the material from which the patterns are to be produced may be cut at once and in the same time as if but a single pattern were being cut out.

My invention consists in the novel construction and combination of parts, as hereinafter described and claimed, with reference, particularly, to a machine in which the essential feature is a rotary cutting-tool mounted in a frame, yoke, or shoe, and driven at a high rate of speed by means of an electromotor or other convenient power.

Referring to the accompanying drawings, illustrating a machine embodying my invention, A designates the cutting-tool, which consists of a circular or other shaped disk or plate, upon the periphery of which are formed teeth B, of any suitable length, contour, or pitch, but of such a character that when the disk is rapidly rotated and brought to bear against the material upon which it is to operate it will cut the same evenly and without injury to the cloth. The cutting-disk is mounted in the forward part of a shoe or frame, C, the side bars, *d*, of which may be curved upward, so as to embrace the cutting-disk on either side, while allowing the latter sufficient freedom of motion to perform its functions. The cutting-disk is fixed upon an arbor, E, which has its bearings in the frame pendents F, and upon such arbor is fitted a pulley, G, connected by a belt or cord, *h*, with a pulley, G', on the motor-shaft.

The frame or shoe C is preferably made in two parts, the bars or runners *d* being hinged to the base of the main frame, and the object of this arrangement is to permit of the vertical adjustment of the cutting-disk to adapt it to the varying conditions under which it is to be used. This adjustment is effected through the medium of first the adjusting-screw I, which works in a threaded bearing in the forward and upper part of the shoe C, and abuts at its lower end against the reversely-bent end *k* of the runners *d*. By turning this screw in one direction, the cutting-disk, with that part of the frame or shoe in which it is arranged, is raised, and the depth of cut thereby diminished, the curved portions of the runners serving to gage the depth of cut and confine the cutting blade or teeth within the desired limit. The rear ends of the runners *d* are extended back beyond their pivotal connection with the frame or shoe, and upon them rests and bears the free end of a plate-spring, K, secured to the base of the shoe. When, therefore, the adjusting-screw is turned in the reverse direction to that already described, the pressure of the spring K lifts the shoe, and thus brings into requisition more of the cutting portion of the disk and produces an increased depth of cut.

L L are rollers, upon which the shoe is mounted at its rear end, such rollers being employed as the means of reducing the friction of the shoe upon the cloth and rendering the device easy of manipulation or progressive movement.

The motor for actuating the cutting-disk may be electro-magnetic, and of any of the approved kinds, which need not be specifically described, the connections from the battery or generator being flexible, so as to allow the device freedom of movement in any direction. Any other motive power, such as steam, air, water, &c., may be employed, the specific form of motor not being an essential consideration or a feature of my invention.

N designates a handle, through which the machine is manipulated or propelled. When an electromotor is used, (N being the armature,) the handle M may be provided with a suitable circuit closer, $n$, which will close the electric circuit leading in and out of contact-points when the handle is grasped.

Having described my invention, I claim—

1. In a machine for cutting cloth-patterns in bulk, the combination, with a frame or shoe adapted to be moved over the surface of the cloth, and which is made in two adjustable sections hinged together, of a rotary cutting-tool journaled to one of said sections and relatively adjustable with respect to the other section, a motor mounted on and supported by said shoe and coupled to said cutter, and means, substantially as described, for adjusting the cutter to different thicknesses of cloth, as set forth.

2. In a machine for cutting cloth-patterns, the combination of the frame or shoe adapted to move over the cloth and made in two sections, C $d$, hinged together and relatively adjustable, with the rollers L L, handle M, rotary cutter A, adjusting-screw I, and a suitable motor supported upon and by the shoe and coupled to the cutter, substantially as described.

3. In a machine for cutting cloth patterns, the combination, with the frame or shoe adapted to move over the cloth and made in two sections hinged together and relatively adjustable, of the rollers L L, handle M, having a circuit-closer, rotary cutter A, and an electro-motor supported upon and by the shoe and coupled to the cutter, substantially as described.

In testimony that I claim the foregoing I have hereunto set my hand this 25th day of March, 1885.

FRANCIS L. ESCHBACH.

Witnesses:
W. C. HYDE,
THOS. A. CONNOLLY.